United States Patent [19]

Teraoka

[11] Patent Number: 5,518,464
[45] Date of Patent: May 21, 1996

[54] TORQUE DIVIDER

[75] Inventor: Masao Teraoka, Tochigi, Japan

[73] Assignee: Tochigi Fugi Sangyo Kabushiki Kaisha, Japan

[21] Appl. No.: 169,667

[22] Filed: Dec. 17, 1993

[30] Foreign Application Priority Data

Dec. 18, 1992 [JP] Japan .................. 4-338340

[51] Int. Cl.$^6$ .............. F16H 1/36; F16H 48/04; F16H 48/28
[52] U.S. Cl. .......................... 475/252; 475/249
[58] Field of Search ............... 475/248, 249, 475/252

[56] References Cited

U.S. PATENT DOCUMENTS

| | | | |
|---|---|---|---|
| 3,420,121 | 1/1969 | Stieg | 475/252 |
| 4,781,078 | 11/1988 | Blessing et al. | 475/252 X |
| 5,055,096 | 10/1991 | Riemscheid et al. | 475/249 |
| 5,122,101 | 6/1992 | Tseng | 475/252 |
| 5,295,922 | 3/1994 | Amborn et al. | 475/248 |
| 5,310,382 | 5/1994 | Guimbretiere | 192/58 C |
| 5,346,443 | 9/1994 | Crysler et al. | 475/252 |
| 5,362,284 | 11/1994 | Brewer | 475/249 |
| 5,389,048 | 2/1995 | Carlson | 475/252 |

FOREIGN PATENT DOCUMENTS

| | | | |
|---|---|---|---|
| 0356401A3 | 2/1990 | European Pat. Off. | |
| 2615262 | 11/1988 | France . | |
| 811650 | 8/1951 | Germany | 475/252 |
| 3906650A1 | 9/1990 | Germany . | |
| 4023332 | 3/1992 | Germany | 475/249 |
| 2-266142 | 10/1990 | Japan . | |
| 2229502 | 9/1990 | United Kingdom | 475/249 |

*Primary Examiner*—Rodney H. Bonck
*Assistant Examiner*—Nathan O. Jensen
*Attorney, Agent, or Firm*—Graham & James

[57] ABSTRACT

A torque divider for distributing the engine torque in a determined torque dividing ratio includes a case which is driven and rotated by an engine and which has first and second supporting holes. In the torque divider first and second side gears are arranged side by side. The second side gear has a predetermined radius larger than that of the first side gear. First and second pinion gears are housed inside the first and second supporting holes, respectively. The first and second pinion gears, respectively, have first and second gear parts. The first gear parts of the first and second pinion gears are meshed with each other; the second gear part of the first pinion gear is meshed with the first side gear; and the second gear part of the second pinion gear is meshed with the second side gear.

7 Claims, 6 Drawing Sheets

TORQUE DIVIDER

BACKGROUND OF THE INVENTION

This invention relates to a torque divider for distributing the engine torque in a determined torque dividing ratio and, in particular, to a torque divider employed in a center differential limiting device which serves to distribute the engine torque to the front wheels and the rear wheels in a four wheel drive motor vehicle.

Figure 1:
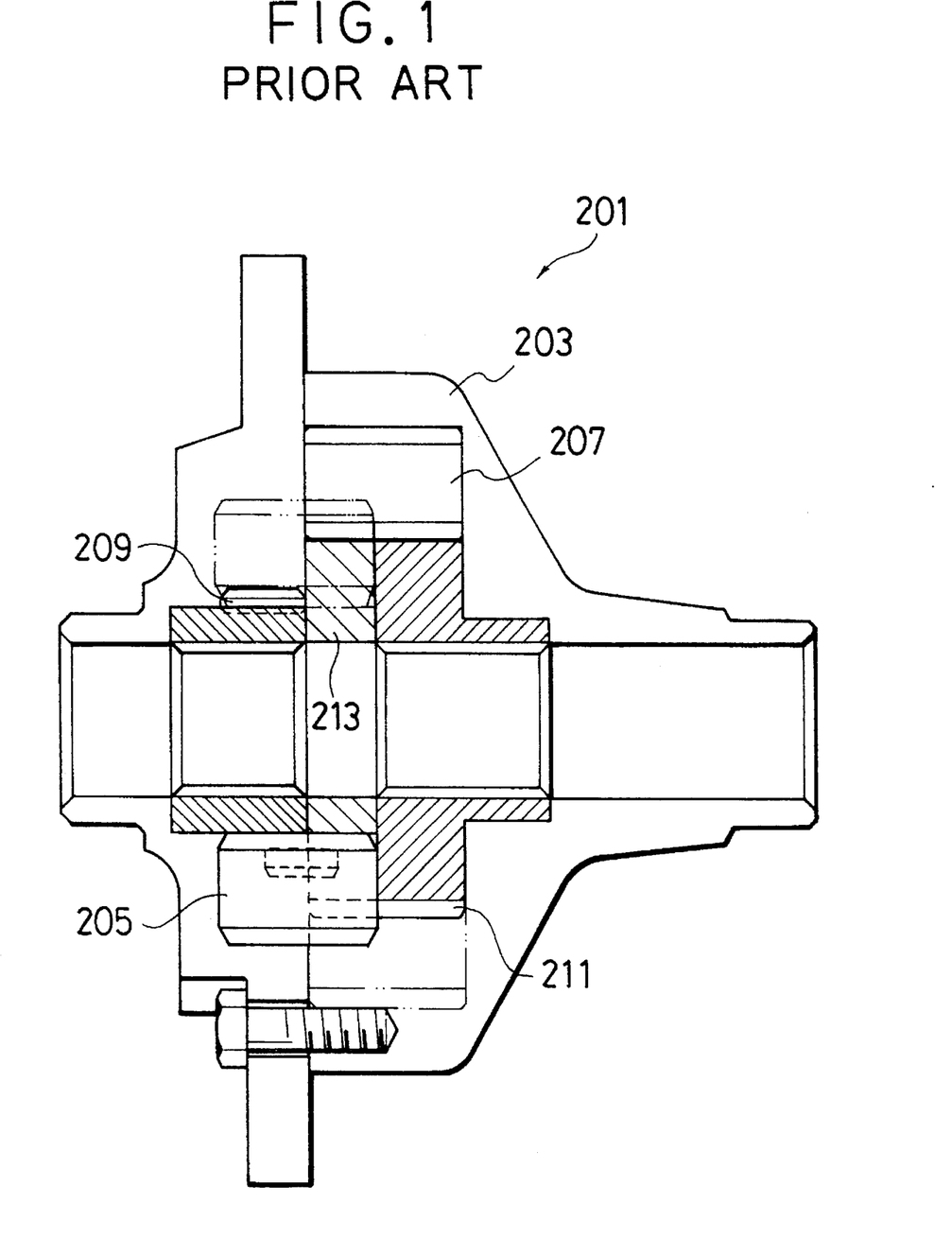
FIG. 1 is a cross-sectional view of a conventional torque divider.

The German Patent Application No. P 39 06 650.9 (the Japanese Patent Application Laid Open No. 2-266142) discloses a conventional torque divider 201 as shown in FIG. 1. This torque divider 201 includes a pair of pinion gears 205, 207 which are housed inside and supported by a differential-gear case 203, and a pair of side gears 209, 211 which are connected to front and rear axle shafts, respectively. The pair of pinion gears 205, 207 mesh with each other. The side gear 209 is meshed with the pinion gear 205, and the side gear 211 is meshed with the pinion gear 207.

The torque of the engine which rotatively drives the differential-gear case 203 is distributed to each front and rear axle shaft through the pinion gears 205, 207 and the side gears 209, 211. The number of gear teeth of the side gear 211 (N2) is greater than that of the side gear 209 (N1). Accordingly, the torque dividing ratio between the side gears 209, 211 is N1:N2. Thus, when this mechanism is employed in the center differential limiting device of a four wheel drive motor vehicle, it is possible to distribute a greater proportion of the total torque to the rear axle shaft than to the front axle shaft.

However, if the radius of the side gear 211 is enlarged to enhance the torque dividing ratio, the radial size of the torque divider 201 also becomes larger. Meanwhile, the limiting factor of the size of the radius of the shaft around which the side gear 209 is secured, deters decreasing the radius of the side gear 209 to enhance the torque dividing ratio in the torque divider 201. Accordingly, it is difficult to enhance the torque dividing ratio in the torque divider 201. Further, since the pinion gears 205, 207 are meshed with the side gears 209, 211 at the inner radial side thereof, it is necessary to fill the space between the side gear 209 and the side gear 211 with a filling member 213 so that the member 213 can receive the thrust force generated in the meshing of the gears 205, 207, 209, 211.

SUMMARY OF THE INVENTION

It is the principal object of the present invention, therefore, to provide a torque divider wherein it is possible to enlarge the torque dividing ratio without enlarging the radial size of the divider.

Another object of the present invention is the provision of a torque divider wherein it is possible to enlarge the torque dividing ratio while reducing the number of members in the divider.

In order to achieve the above-mentioned object, this invention provides a torque divider, comprising: a case being driven and rotated by an engine; first and second supporting holes being provided in said case; a first side gear; a second side gear being located adjacent to the first side gear, said second side gear having a predetermined radius larger than a predetermined radius of the first side gear; and first and second pinion gears, respectively, being housed inside the first supporting hole and the second supporting hole, said first and second pinion gears, respectively, having a first gear part and a second gear part, said first gear parts of the first and second pinion gears being meshed with each other, said second gear part of the first pinion gear being meshed with the first side gear and said second gear part of the second pinion gear being meshed with the second side gear.

Further, in the torque divider according to the present invention, the second gear part of the first pinion gear has a predetermined radius larger than a predetermined radius of the first gear part of the first pinion gear and/or the second gear part of the second pinion gear has a predetermined radius smaller than a predetermined radius of the first gear part of the second pinion gear. That is, the second gear part of the first pinion gear, which is meshed with the first side gear with a radius smaller than that of the second side gear, has a radius larger than that of the first gear part of the first pinion gear, and/or the second gear part of the second pinion gear, which is meshed with the second side gear with a radius larger than that of the first side gear, has a radius smaller than that of the first gear part of the second pinion gear.

In this manner, it is possible to reduce the radial size of the torque divider while enlarging the torque dividing ratio.

In the above-mentioned configuration, while the number of gear teeth of the first side gear (N1) is predetermined smaller than that of the second side gear (N2) and the inequality, n2'/n1'<n2/n1 is satisfied, where n1' and n2' are the number of gear teeth of the first and second gear parts of the second pinion gear, respectively, and n1 and n2 are the number of gear teeth of the first and second gear parts of the first pinion gear, respectively; since X=N2/N1·n2/n1·n1'/n2' is given, where X is the torque dividing ratio, a large torque ratio is obtained by, for example, setting the number of second gear part gear teeth of the first pinion gear (n2) to be greater than that of first gear part gear teeth of the first pinion gear (n1) (i.e. n2>n1) and by setting the number of first and second gear part gear teeth of the second pinion gear (n1', n2') to be equal (i.e. n1'=n2').

Meanwhile, while the size of pitch radius of the first side gear (R1) is predetermined smaller than that of the second side gear (R2) and r2'/r1'<r2/r1 is satisfied, where r1' and r2' are the sizes of pitch radii of the first and second gear parts of the second pinion gear, respectively, and r1 and r2 are the sizes of pitch radii of the first and second gear parts of the first pinion gear, respectively; since X=R2/R1·r2/r1·r1'/r2' is given, where X is the torque dividing ratio, a large torque ratio is obtained, for example, by selecting a larger pitch radius of the second gear part of the first pinion gear (r2), a smaller pitch radius of the first gear part of the first pinion gear (r1) and an equal pitch radii of first and second gear parts of the second pinion gear (r1', r2').

Thus, it is possible to enlarge the torque dividing ratio without enlarging either side gears; namely, without enlarging the size of the torque divider, thereby facilitating the possibility of employing this torque divider in various types of motor vehicles. Further, since the enhancement of the torque dividing ratio depends upon the number of gear teeth or the pitch radius of the pinion gears, the second side gear with a larger pitch radius than that of the first side gear can, more easily, be made relatively smaller, thereby enhancing minimization of the torque divider's size.

Moreover, since the second side gear is located adjacent to the first side gear, it is not necessary to provide a member to receive the thrust force, thereby reducing the number of members in the torque divider.

DESCRIPTION OF THE PREFERRED EMBODIMENTS

Figure 2:
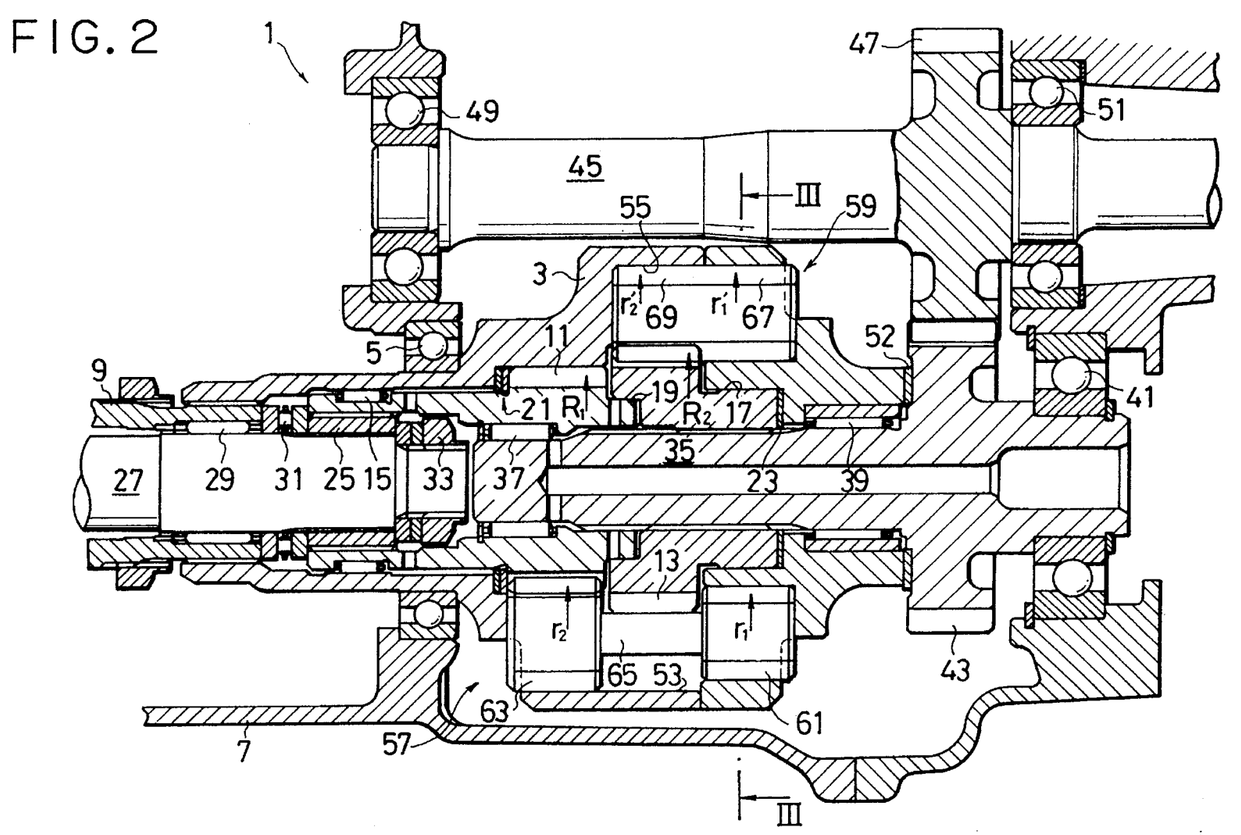
FIG. 2 is a cross-sectional view of a torque divider according to a first embodiment of the present invention.
Figure 3:
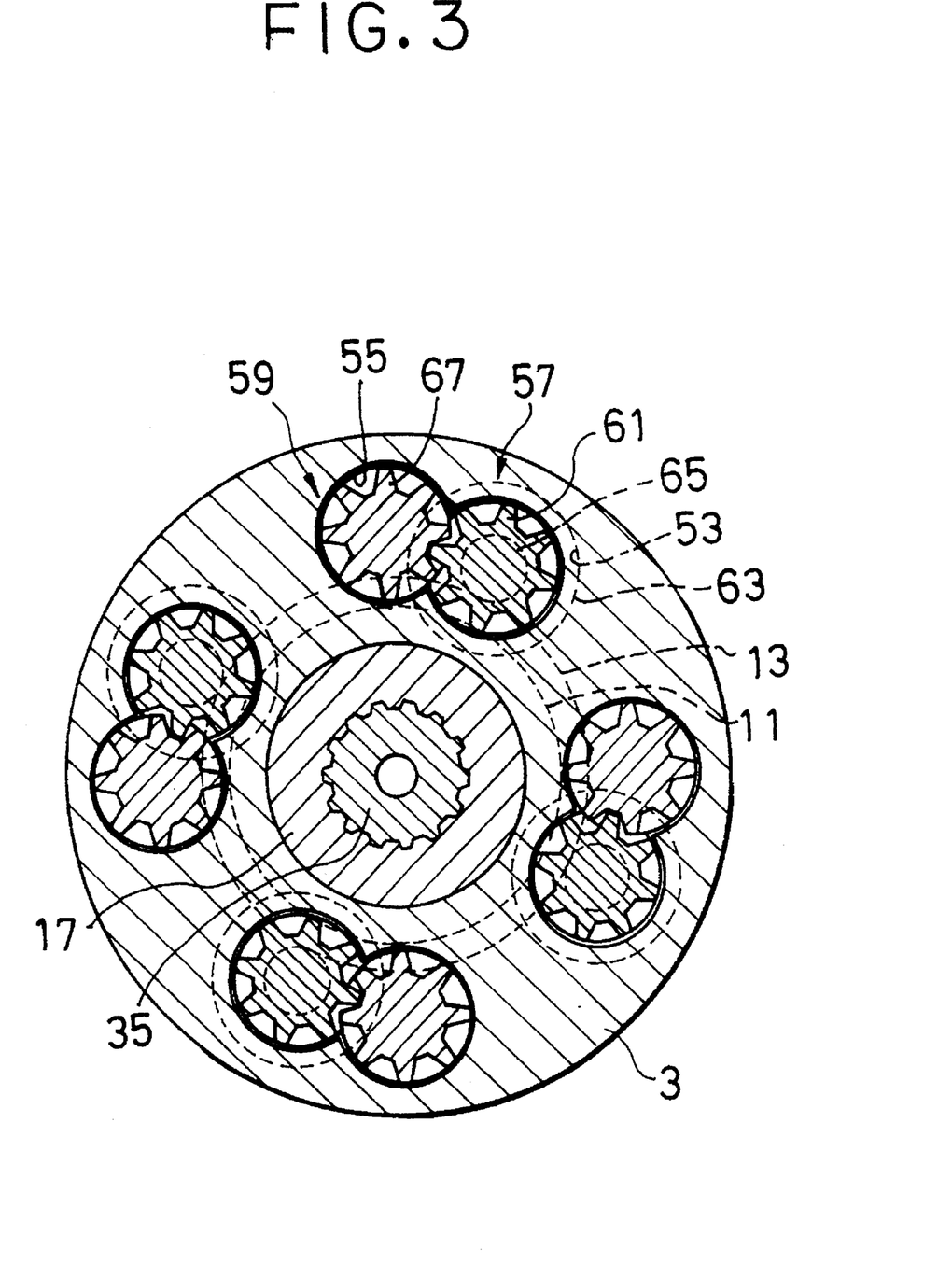
FIG. 3 is a cross-sectional view of the torque divider, taken in a direction shown by arrow III—III of FIG. 2.

Referring to FIGS. 2 and 3, a first embodiment of this invention will be described. A torque divider according to this embodiment is employed in a center differential limiting device 1 which distributes torque generated in an internal combustion engine of a four wheel drive motor vehicle to the front wheels and the rear wheels. The below-described front and rear sides or directions correspond to the left and right sides or directions in FIG. 2 and the below-described members without any reference numerals are not shown in any Figures.

As shown in FIG. 2, the front end of an inner case 3 is supported inside a transfer case 7 through a bearing 5. The inner case 3 is connected to output members of a transmission through a hollow shaft 9 which is spline connected to the inner case 3, so as to be rotatively driven by the engine.

Side gears 11, 13 have the same axis and are arranged in the front and rear sides, respectively, inside the inner case 3. The side gear 13 has a predetermined size of pitch radius larger than that of the side gear 11. The front end of the side gear 11 is supported along the inner periphery of the inner case 3 through a bearing 15. The rear end of the side gear 13 is supported by a shaft support portion 17 inside the inner case 3. A shaft support member 19 is provided between the side gears 11, 13. Through the shaft support member 19, each opposite end of the side gears 11, 13 are firmly maintained and the centering for the side gears 11, 13 is executed. A washer 21 is provided between the side gear 11 and the inner case 3 and a washer 23 between the side gear 13 and the inner case 3.

The side gear 11 is connected to a transmission shaft 27 for the front wheels through a coupling sleeve 25. The transmission shaft 27 is supported along the inner periphery of the hollow shaft 9 through a bearing 29. A bearing 31 is provided between the rear end of the hollow shaft 9 and the front ends of the coupling sleeve 25 and the side gear 11. A threaded nut 33 is fastened at the rear end of the transmission shaft 27 so as to prevent the coupling sleeve 25 from slipping off. The torque of the side gear 11 is distributed to the right and left front wheels through the transmission shaft 27 and a front differential device.

The side gear 13 located behind the side gear 11 is spline connected to a transmission shaft 35 for the rear wheels. The transmission shaft 35 is supported by the side gear 11, the inner case 3, and the transfer case 7 through bearings 37, 39, 41, respectively. A gear portion 43 provided on the transmission shaft 35 is meshed with gear portion 47 provided on a parallel shaft 45 which is supported by the transfer case 7 through bearings 49, 51. A washer 52 is provided between the gear portion 43 and the inner case 3. The torque of the side gear 13 is distributed to the right and left rear wheels through the transmission shaft 35, the parallel shaft 45, and a rear differential device.

Four sets of a pair of supporting holes 53, 55 are provided in the inner case 3 as shown in FIGS. 2 and 3. First and second pinion gears 57, 59 are housed inside the supporting holes 53, 55, respectively.

The pinion gear 57 has a length along the axis thereof larger than that of the pinion gear 59 and consists of a first gear part 61, a second gear part 63, and a shaft part 65 which connects the first and second gear parts 61, 63 to each other. The first gear part 61 has a smaller radius than that of the second gear part 63. The pinion gear 59 consists of a second gear part 69 and a first gear part 67 which is located behind the second gear part 69. The first gear part 61 of the pinion gear 57 is meshed with the first gear part 67 of the pinion gear 59 and the second gear part 63 is meshed with the side gear 11. Further, the second gear part 69 of the pinion gear 59 is meshed with the side gear 13.

The driving force of the engine which rotates the inner case 3 is transmitted to the pinion gears 57, 59 through the inner case 3 and to the side gears 11, 13 through the pinion gears 57, 59 and is distributed to the front and rear wheel sides. Even if differences of driving resistance between the front and rear wheels occur, the driving force of the engine is differentially distributed to both front and rear wheel sides due to the self rotation of the pinion gears 57, 59. Further, while the driving force or torque is distributed, since the pinion gears 57, 59 are pressed to the walls of the supporting holes 53, 55, respectively, due to the meshing reaction force generated between the side gears 11, 13, the generated frictional torque serves to limit the differential distribution of the torque.

In the above-explained configuration, there are two methods to enhance the torque dividing ratio.

In the first method, in order to increase the torque dividing ratio (i.e. the ratio of the torque distributed to the front wheels to the torque distributed to the rear wheels) higher than the ratio of the number of gear teeth on the second side gear (N2) to that of the first side gear (N1) (i.e. N2/N1), the number of gear teeth of the first and second gear parts 61, 63 of the pinion gear 57 (n1, n2) and the number of gear teeth of the first and second gear parts 67, 69 of the pinion gear 59 (n1', n2') is determined, respectively, using the following conditional expressions:

$$N1 < N2 \qquad (1)$$

$$N2/N1 < N2/N1 \cdot n2/n1 \cdot n1'/n2'. \qquad (2)$$

Solving the conditional expression (2) results in $$n2'/n1' < n2/n1. \qquad (3)$$

Thus, the number of gear teeth of the pinion gears 57, 59 is determined so as to satisfy the expressions (1) and (3). For example, the number of gear teeth for the side gears 11, 13 (N1, N2) is determined as N1=15, N2=18; the number of gear teeth for the first and second gear parts 61, 63 (n1, n2) of the pinion gear 57 as n1=6, n2=8; and the number of gear teeth for the first and second gear parts 67, 69 (n1', n2') of the pinion gear 59 as n1'=n2'=6.

Accordingly, the ratio of the torque distributed to the front wheels to the torque distributed to the rear wheels can be calculated as N2/N1·n2/n1=1.2×8/6=1.6, which is greater than N2/N1=18/15=1.2; this latter value is the ratio obtained in a conventional torque divider which considers only the gear teeth ratio for the side gears 11, 13.

In this situation, the torque dividing ratio does not depend only on the gear teeth ratio for the side gears 11, 13, it also can depend on the number of the gear teeth ratio for the second and first gear parts 63, 61 (n2/n1) of the pinion gear 57. In other words, if the number of the gear teeth ratio for the second and first gear parts 63, 61 (n2/n1) is determined to be large when the number of gear teeth for the first and second gear parts 67, 69 (n1', n2') of the pinion gear 59 is the same, the torque dividing ratio will in turn be large. In this situation, since the second gear part 63 is meshed with the side gear 11, which has a smaller radial size than that of the side gear 13, even when the radial size of the second gear part 63 is larger than that of the first gear part 61, it is possible to prevent the inner case 3 from being enlarged. Thus, without enlarging the radial size of the side gear 13 with a larger radial size than that of the other side gear 11, namely without enlarging the radial size of the inner case 3 and making the whole center differential limiting device 1 large and heavy, the torque dividing ratio for the front and rear wheel sides can easily be enhanced, thereby improving the acceleration performance of the vehicle. In other words, it is possible to minimize the size of the center differential limiting device 1 by reducing the size of the side gear 13 which has a larger radial size than that of the side gear 11 within the limit of the radial size thereof. Moreover, it is possible to further enhance the torque dividing ratio by changing the ratio of the number of gear teeth for the first and second gear parts 67, 69 (n1'/n2') in addition to the ratio of the number of gear teeth for the second and first gear parts 63, 61 (n2/n1).

In the second method to enhance the torque dividing ratio, the sizes of pitch radii of the gears or the gear parts are determined, respectively. This is done as an alternative to determining the number of gear teeth on the gears or the gear parts as in the first method, so as to satisfy the following conditional expressions:

$$R1<R2 \tag{4}$$

$$r2'/r1'<r2/r1 \tag{5}$$

where R1 and R2 are the sizes of the pitch radii of the side gears 11, 13, respectively; r1' and r2' are the sizes of pitch radii of the first and second gear parts 67, 69 of the pinion gear 59, respectively; and r1 and r2 are the sizes of pitch radii of the first and second gear parts 61, 63 of the pinion gear 57, respectively, as shown in FIG. 2.

In this second method, the torque dividing ratio does not depend only on the pitch radius ratio for the side gears 11, 13, it also can depend on the pitch radius ratio for the second and first gear parts 63, 61 (r2/r1) of the pinion gear 57 and the pitch radius ratio for the first and second gear parts 67, 69 (r1'/r2') of the pinion gear 59. In other words, if the pitch radius ratio for the second and first gear parts 63, 61 (r2/r1) (or the pitch radius ratio for the first and second gear parts 67, 69 (r1'/r2')) is determined to be large, the torque dividing ratio will in turn be large. Thus, it is possible to prevent the inner case 3 from being enlarged, as explained in the first method. Accordingly, the same effects are obtained in this second method.

In both above-explained first and second methods, since the side gears 11, 13 are arranged parallel to each other and the meshing contact between the pinion gears 57, 59 is executed behind the side gears 11, 13, it is not necessary to provide a member to receive the thrust force between the side gears 11, 13, which is needed in the prior art, thereby reducing the number of members in the center differential limiting device 1.

Figure 4:
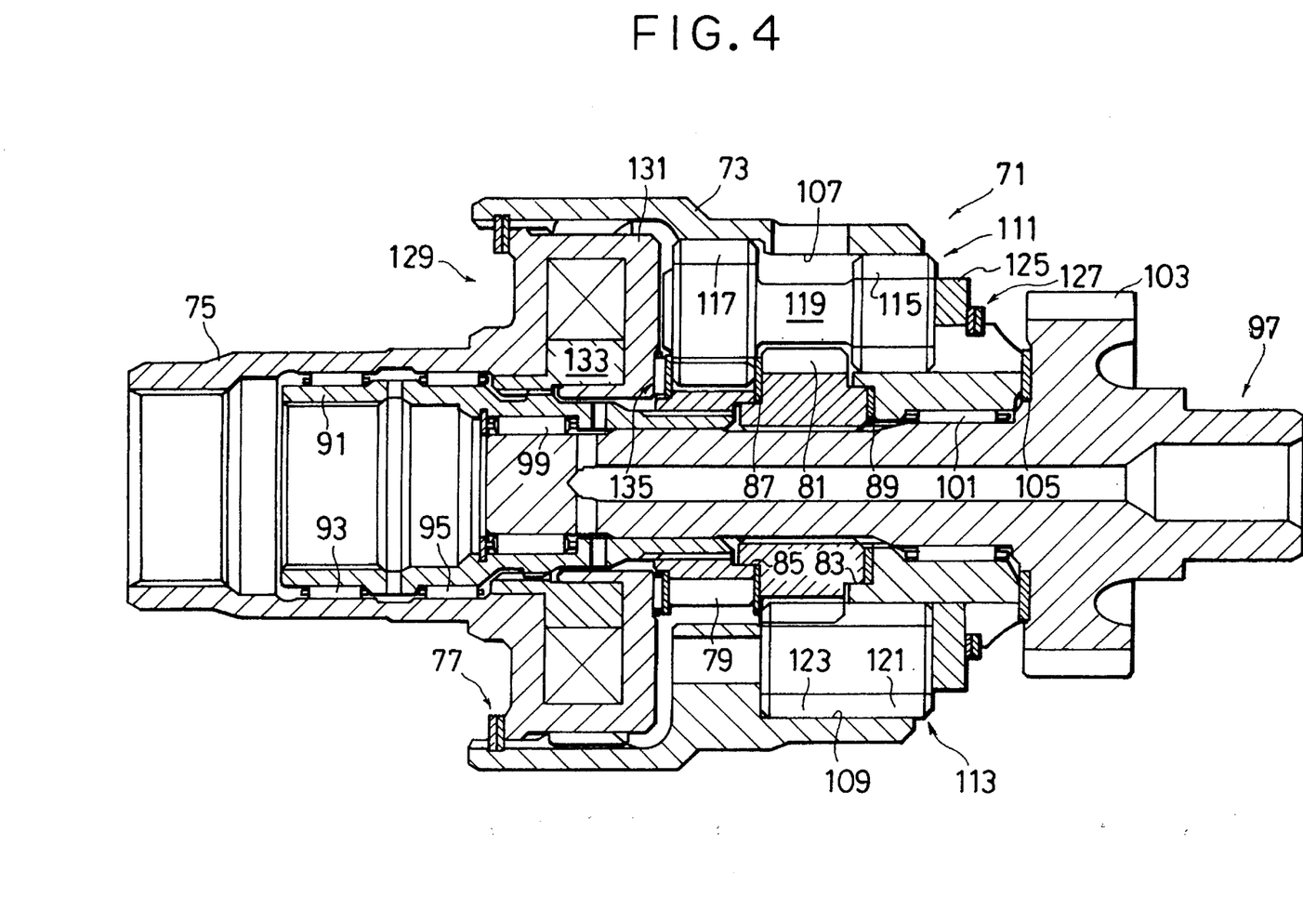
FIG. 4 is a cross-sectional view of a torque divider according to a second embodiment of the present invention.

Next, referring now to FIG. 4, a second embodiment of the present invention will be described.

A torque divider according to this second embodiment is also employed in a center differential limiting device 71 as in the first embodiment. The below-described front and rear sides or directions correspond to the left and right sides or directions in FIG. 4 and the below-described members without any reference numerals are not shown in any Figures.

A boss 75 is spline connected with a case 73, while being prevented from slipping off by a locating snap ring 77. The boss 75 is connected to output members of a transmission. The case 73 is rotatively driven by the engine.

Side gears 79, 81 have the same axis and are arranged in the front and rear sides, respectively, inside the case 73. The rear end of the side gear 81 is supported by a shaft support portion 83 inside the case 73. Each opposite end of the side gears 79, 81 support each other and center each other by use of a shaft support member 85 provided therein. Washers 87, 89 are provided between the side gears 79, 81 and between the side gear 81 and the case 73, respectively.

The side gear 79 is spline coupled with a hollow shaft 91 for the front wheel side. The hollow shaft 91 is supported along the inner periphery of the boss 75 through bearings 93, 95. The torque of the side gear 79 is distributed to the right and left front wheels through the hollow shaft 91 and a front differential device.

The side gear 81 located behind the side gear 79 is spline coupled with a transmission shaft 97 for the rear wheel side. The transmission shaft 97 is supported by the hollow shaft 91 through a bearing 99 and by the case 73 through a bearing 101. A gear portion 103 of the transmission shaft 97 is meshed with a gear portion of a parallel shaft, which is connected to a propeller shaft for the rear wheels. The torque of the side gear 81 is distributed to the right and left rear wheels through a rear differential device. A washer 105 is provided between the gear portion 103 and the case 73.

Four pairs of supporting holes 107, 109 are provided in the case 73. First and second pinion gears 111, 113 are housed inside the supporting holes 107, 109, respectively.

The pinion gear 111 has a length along the axis thereof larger than that of the pinion gear 113 and consists of a first gear part 115, a second gear part 117, and shaft part 119 which connects the first and second gear parts 115, 117 to each other. The first gear part 115 has a smaller radius than that of the second gear part 117. The pinion gear 113 consists of a second gear part 123 and a first gear part 121 which is located behind the second gear part 123. The first gear part 115 of the pinion gear 111 is meshed with the first gear part 121 of the pinion gear 113 and the second gear part 117 is meshed with the side gear 79. Further, the second gear part 123 of the pinion gear 113 is meshed with the side gear 81, which has a larger radius than that of the side gear 79. A supporting member 125 is provided at the rear end of the case 73 which is retained by a locating snap ring 127 so as to prevent the supporting member 125 from slipping off.

The number of gear teeth for the side gears 79, 81 (N1, N2) is determined as 15, 18; and the number of gear teeth for the first and second gear parts 115, 117, 121, 123 (n1, n2, n1', n2') as 6, 8, 6, 6, respectively. Thus, the ratio of the front wheels side torque to the rear wheels side torque is enhanced to 1.6 from 1.2; the latter value being the torque ratio obtained in the prior art which considers only the side gears 79, 81, as explained in the first embodiment.

Meanwhile, the meshing reaction force of the pinion gears 111, 113 to the side gears 79, 81, which occurs while the torque is transmitted, is proportional to the transmitted torque. Accordingly, the differential limiting function depends upon the frictional force between the supporting holes 107, 109 and the pinion gears 111, 113; thus the function may be called a "torque proportional" type function.

The center differential limiting device 71 includes two types of differential limiting devices, a rotational speed proportional type 129 and the torque proportional type. One side of the differential limiting device 129 includes a rear-end portion 131 provided in the boss 75 which is spline coupled with the case 73. The other side of the differential limiting device 129 includes a member 133 which is spline coupled with the outer periphery of the hollow shaft 91, which is arranged in the front wheels side. The rear-end portion 131 contacts with the side gear 79 and the pinion gear 111 through a bearing 135. The rotational speed proportional type of differential limiting device 129 is exemplified by a "pump" type of coupling device and a "multi-plate" type of viscosity coupling device, etc. In FIG. 4, the multi-plate type is shown. The viscous coupler includes multiple inner and outer side resistance plates disposed alternately and along the axis of the hollow shaft 91. By utilizing both types of differential limiting functions (i.e. the rotational speed proportional type and the torque proportional type), even if one front wheel on the vehicle idles, a relatively large amount of power can be transmitted to the rear wheels. The same result holds true if a rear wheel idles; thereby improving driving performance through bad road conditions. Thus, the center differential limiting device 71 can facilitate steady driving or operating performance.

Also, in the center differential limiting device 71, it is possible to enhance the torque dividing ratio by changing the number of gear teeth of the pinion gears 111, 113 without enlarging and making the whole device heavy, as is also accomplished in the first embodiment. Further, it is not necessary to provide a member to receive the thrust force between the side gears 79, 81.

Figure 5:
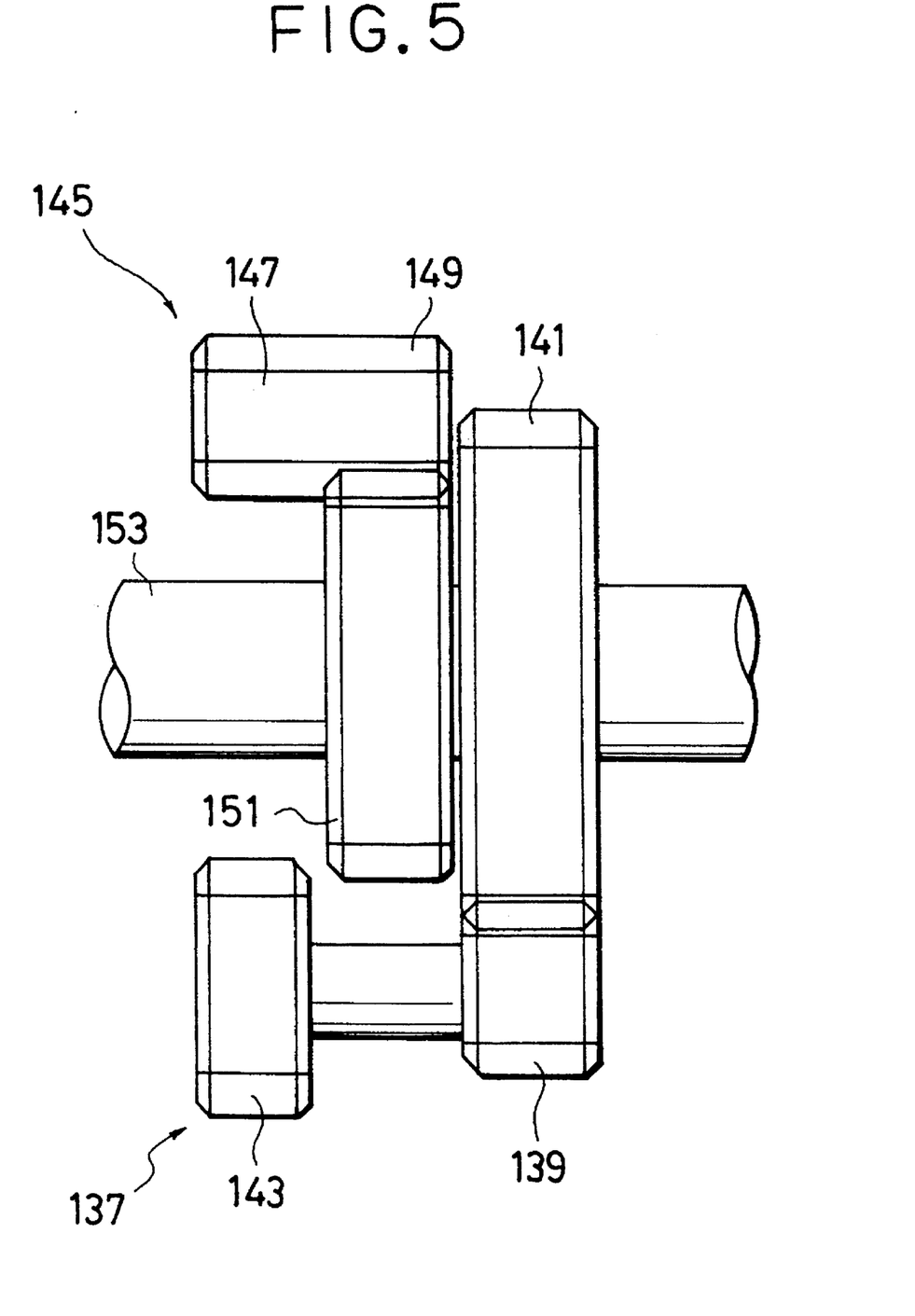
FIG. 5 is a cross-sectional view of a torque divider according to a third embodiment of the present invention.

Next, referring now to FIG. 5, a third embodiment of the present invention will be described.

In this embodiment, a pinion gear 137 includes a first gear part 143 and a second gear part 139 which has a smaller radius than that of the first gear part 143. The second gear part 139 is meshed with a side gear 141 which has a larger radius than that of a side gear 151 located adjacent to the side gear 141. Further, the first gear part 143 is meshed with a first gear part 147, which is provided in a pinion gear 145. Since a second gear part 149 provided in the pinion gear 145 is meshed with the side gear 151 having a smaller radius than that of the side gear 141, the pinion gear 145 is located relatively close to a shaft 153 around which the side gear 151 is arranged. Accordingly, even when the first gear part 143 of the pinion gear 137 has a relatively large radius, it is possible to avoid enlarging the whole device, as in the first and second embodiments explained above.

Where N1 is the number of gear teeth of the side gear 151 having a smaller radius than that of the side gear 141; N2 is the number of gear teeth of the side gear 141; n1 and n2 are the number of gear teeth of the first and second gear parts 147, 149 of the pinion gear 145, respectively; n1' and n2' are the number of gear teeth of the first and second gear parts 143, 139 of the pinion gear 137, respectively; if each number of gear teeth is selected to satisfy n2'/n1'<n2/n1, the torque dividing ratio for the front and rear wheel sides can be larger than the torque dividing ratio which depends only upon the ratio of the number of gear teeth of the side gear 141 to the number of gear teeth of the side gear 151, namely N2/N1, as in the prior art.

Figure 6:
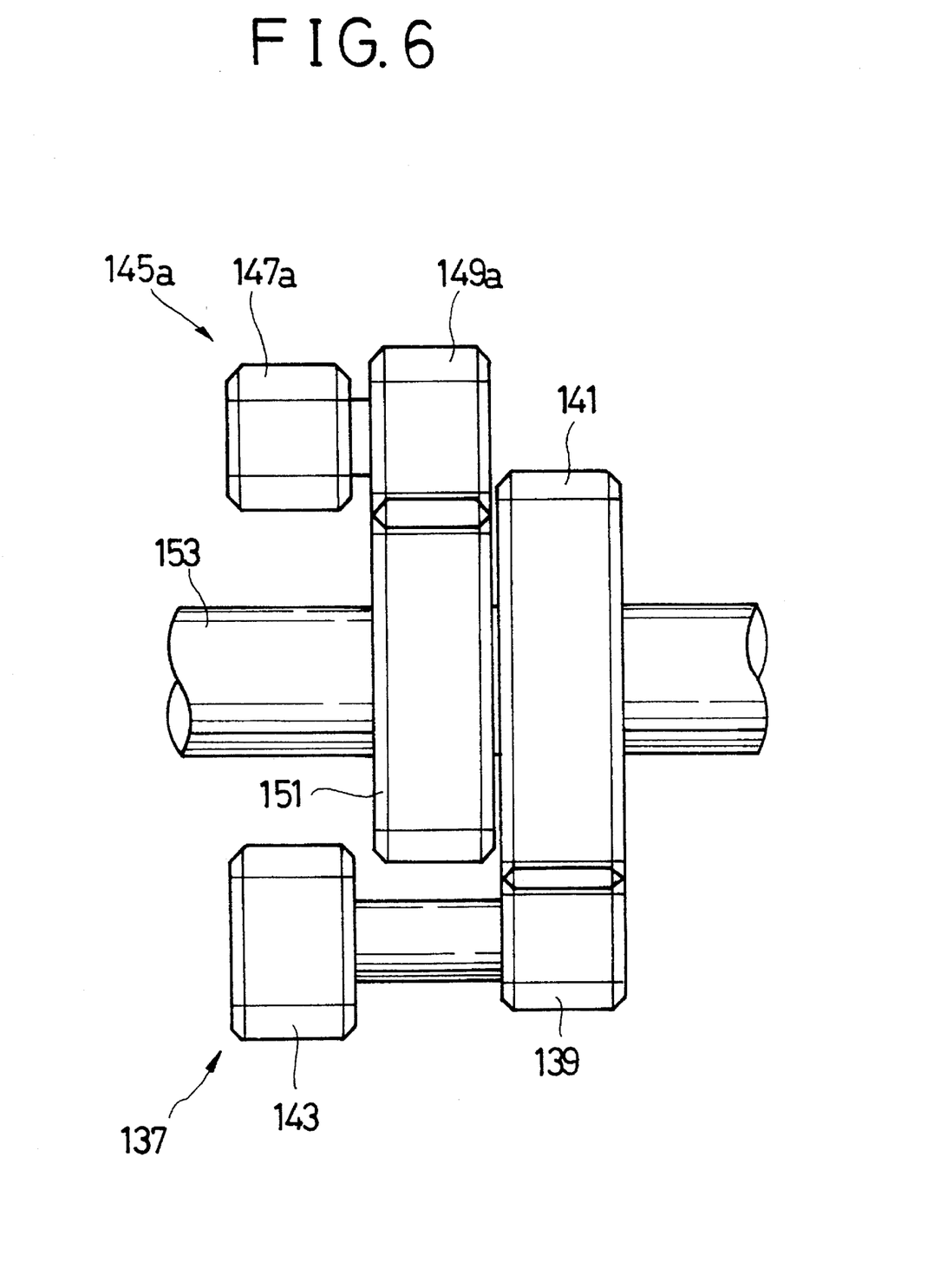
FIG. 6 is a cross-sectional view of a torque divider according to a fourth embodiment of the present invention.

FIG. 6 shows a fourth embodiment of the present invention. All of the parts and their characteristics remain the same as in FIG. 5 except for a first pinion gear 145a which has a first gear part 147a whose radius is smaller than that of its second gear part 149a.

What is claimed is:

1. A torque divider for distributing an engine torque in a determined torque dividing ratio, comprising:

a case driven and rotated by an engine, said case defining first and second supporting holes;

a first side gear and a second side gear positioned in said case for receiving a pair of respective transmission shaft ends for rotation therewith about a common axes, said second side gear being located adjacent to the first side gear, said second side gear having a predetermined radius larger than a predetermined radius of the first side gear; and first and second pinion gears, respectively, rotatably supported in the first supporting hole and the second supporting hole, said first and second pinion gears, respectively, each having a first gear part and a second gear part, said first gear parts of the first and second pinion gears being in a meshing engagement with each other, said second gear part of the first pinion gear being in a meshing engagement with the first side gear, and said second gear part of the second pinion gear being in a meshing engagement with the second side gear, said second gear part of the first pinion gear having a predetermined radius larger than a predetermined radius of the first gear part of the first pinion gear and/or said second gear part of the second pinion gear having a predetermined radius smaller than a predetermined radius of the first gear part of the second pinion gear, the meshing engagement of said first and second side gears and said first and second pinion gears interconnecting said respective transmission shaft and in a mutual driving relationship.

2. A torque divider as claimed in claim 1, wherein the second gear part of the first pinion gear is meshed with the first side gear and the first and second gear parts of the first pinion gear are coupled by and rotatable with a first coupling shaft, said first coupling shaft being located around the second side gear, and wherein the second side gear is located between the first side gear and the first gear parts in the axial direction thereof.

3. A torque divider as claimed in claim 1, wherein the second gear part of the first pinion gear is meshed with the first side gear and the first and second gear parts of the second pinion gear are coupled by and rotatable with a second coupling shaft, said second coupling shaft being located around the first side gear, and wherein the first side gear is located between the second side gear and the first gear parts in the axial thereof.

4. A torque divider as claimed in claim 2, wherein the first and second gear parts of the second pinion gear have the same number of gear teeth.

5. A torque divider as claimed in claim 1, wherein the frictional force generated between the first and second supporting holes and the first and second pinion gears serves as a torque proportion type of differential limiting function.

6. A torque divider as claimed in claim 5, further comprising a rotational speed proportion type of differential limiting device, said rotational speed proportion type of device being disposed between the outer periphery of the transmission shaft end and the inner periphery of the case, said rotational speed proportion type device being arranged adjacent to one end of the pinion gear in the axial direction thereof.

7. A torque divider as claimed in claim 1, wherein said case defines the first and second supporting holes to allow at least parts of at least one distal end of the first and second pinion gears to be exposed to the outside of the case while restricting the axial and radial movements of the first and second pinion gears inside the supporting holes.

* * * * *